April 1, 1969     T. D. LODE     3,436,131
INSTRUMENT BEARING
Filed Jan. 13, 1965
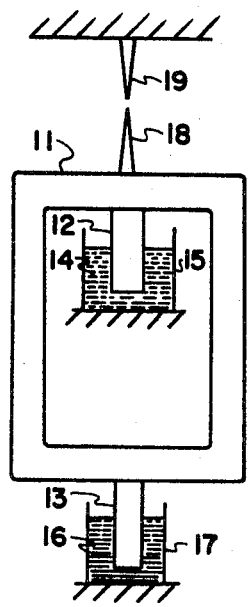
INVENTOR
*TENNY D. LODE*

United States Patent Office 3,436,131
Patented Apr. 1, 1969

3,436,131
INSTRUMENT BEARING
Tenny D. Lode, Madison, Wis., assignor to Rosemount Engineering Company, Minneapolis, Minn., a corporation of Minnesota
Filed Jan. 13, 1965, Ser. No. 425,156
Int. Cl. F16c 35/00, 39/00
U.S. Cl. 308—10                                    7 Claims

ABSTRACT OF THE DISCLOSURE

A free turning support mechanism which is supported vertically by liquid floatation and which is gently constrained from movement in a horizontal plane by means of a force field requiring no solid connection between the support mechanism and a stationary member. Electrically conducting liquid pools are provided for making electrical connection to a pair of conducting leads to the support mechanism without disturbing the free turning characteristics.

---

This invention relates to a bearing or support mechanism for precision instruments and other applications. More particularly, it relates to a free turning bearing or support which is particularly free from friction and spring restraint forces.

Medium grade electrical instruments, such as moving pointer panel meters, generally employ jeweled bearings to reduce static friction. Higher sensitivity instruments, such as sensitive galvanometers, usually employ a movable coil suspended by a fine wire or flattened band. The electrical connections to the movable coil are usually made through two such wires or bands, one going up from the top of the movable coil and one going down from the bottom. The suspended coil design eliminates bearing friction. The principal torques on the movable coil are the electromagnetic forces being measured and the spring torques due to twisting of the suspension wires. The spring forces due to the suspension wires are one of the limitations of the sensitivity of such instruments.

In high impedance instruments there is usually no problem in bringing currents to and from a movable coil through the suspension wires. However, in the case of a low impedance instrument, it may be necessary to use heavier support wires to carry the larger currents thereby decreasing the power sensitivity of the instrument. The Siemens Company of Germany has produced instruments in which the electrical connections to the movable coil are made through wires dipping into mercury pools, and the suspension wires or bands are used only for mechanical support and centering. With the Siemens construction, the sensitivity of the instrument is still limited by the spring torques due to twisting of the support wires.

An object of the present invention is to provide a method and means for the construction of bearings and support mechanisms for use in electrical and scientific instruments and other applications. A further object is to provide such bearings which will be essentially free from frictional and/or mechanical spring forces.

In a particular form of the present invention, a rotatable structure is floated in one or more small pools of liquid. Magnetic, electric or other forces not requiring direct mechanical contact are used to keep the structure centered with a minimum resistance to turning. Electrical connections may be made through one or more pools of mercury or other conductive fluid.

In the drawing:

The figure is an illustration of a first form of the present invention.

Referring now to the drawing, the figure includes movable element 11 with attached floats 12 and 13. Float 12 extends into mercury pool 14 contained within stationary cup 15. Float 13 similarly extends into mercury pool 16 contained within stationary cup 17. Needle 18 is attached to movable element 11 and extends upward therefrom. Stationary needle 19 extends downward towards the tip of needle 18.

The previously mentioned Siemens' instrument suggests that a more sensitive instrument might be made by floating the movable coil of a galvanometer or other instrument in two mercury pools which would provide both the electrical connections and mechanical support. The elimination of solid connections between the movable coil and the remainder of the instrument would essentially eliminate friction and spring forces. The problem is that some form of centering must be provided so that the movable coil or element does not drift slowly to one side. The figure illustrates an instrument bearing which overcomes this problem. Movable element 11, which may be the movable coil of a galvanometer, is provided with floats 12 and 13 which dip into stationary mercury filled cups 15 and 17. These floats support almost all of the weight of the movable assembly and also provide electrical connections. As shown in the figure, the upper float 12 is slightly larger than lower float 13 to reduce tendencies of movable element 11 to tip. In one form of the invention, needle 18 is magnetically permeable and extends upward from the top of movable element 11 towards stationary needle 19 which is permanently magnetized along a vertical axis. The operation of the structure of the figure is that movable element 11 essentially floats in mercury pools 14 and 16 while small centering forces are provided by the mutual attraction between needles 18 and 19. Movable element 11 will be free to rotate with essentially no friction or spring restoring forces. The arrangement of the mercury filled cups, one above the other about the axis of rotation, serves to reduce the viscous drag of the fluid support. If electrical connections to movable element 11 are not required, nonconducting fluids may be used in place of mercury. If more than two electrical connections are required, the design may be extended to include additional mercury filled cups. Conductive fluids other than mercury may also be used to provide electrical connections as well as floatation.

The drawing and the preceding description have shown a particular method and means for providing centering forces upon a rotatable element without a solid connection thereto. Suitable centering forces may be provided without solid connection in a variety of manners. For example, centering may be provided by the use of dielectric needles with one or both permanently electrified so as to generate an electrostatic field, by the use of conducting needles, one or both of which are electrically charged to a high potential, by the use of alternating electric and/or magnetic fields, or by moving gas streams. Noncontact centering forces may also be provided by inducing a fluid flow in the liquid filled cups. For example, centering forces would be provided with a fluid flow which would be upward around the outside of the cup, radially inward near the top of the cup and down at the center.

What is claimed is:

1. A free turning support for a rotatable element including means for supporting said element against vertical translational motion by flotation of first and second vertically spaced float portions of said element in first and second liquid pools respectively, and means for attracting said element to a reference position in the horizontal plane without solid connection thereto.

2. The combination of claim 1 wherein said first and second boat portions have coincident axis of rotation.

3. The combination of claim 2 wherein said first float portion is positioned directly above said second float portion and is substantially more buoyant than said second float portion.

4. A scientific instrument including a rotatable structure supported against translational motion in a vertical direction by a float immersed in a pool of liquid and forming a part of said rotatable structure, a first mechanical element on said rotatable structure, a second mechanical element at a reference position in a horizontal plane and not attached to said rotatable structure, means causing an attractive force between said first and second mechanical elements, first and second electrically conducting liquid pools positioned near said rotatable structure, and first and second electrical conductors extending from said rotatable structure to said first and second conducting liquid pools respectively.

5. The combination of claim 4 wherein said first and second mechanical elements each has a needle-like tip portion having a longitudinal axis and wherein said tips are normally positioned in a confronting and coaxial relation to each other by electrical field forces.

6. A free turning support for a rotatable element including a float forming part of said rotatable element and immersed in a pool of liquid, a first mechanical element on said rotatable element, a second mechanical element at a reference position in a horizontal plane and not attached to said rotatable element, and means causing electrostatic attraction between said first and second mechanical elements.

7. A free turning support for a rotatable element including a pair of electrically conducting floats forming part of said rotatable element and immersed in respective pools of conducting liquid, thereby providing vertical support and electrical connections to said element, and means for attracting said element to a reference position in the horizontal plane without solid connection thereto.

References Cited

UNITED STATES PATENTS

| | | | |
|---|---|---|---|
| 3,199,932 | 8/1965 | Clark | 308—10 |
| 408,295 | 8/1889 | DeFerranti | 308—9 |
| 1,424,804 | 8/1922 | Day | 308—9 |
| 1,472,198 | 10/1923 | Taylor | 308—10 |

MILTON O. HIRSHFIELD, *Primary Examiner.*

L. L. SMITH, *Assistant Examiner.*

U.S. Cl. X.R.

308—9